United States Patent
Tobita

(10) Patent No.: US 7,005,838 B2
(45) Date of Patent: Feb. 28, 2006

(54) VOLTAGE GENERATION CIRCUIT

(75) Inventor: Youichi Tobita, Hyogo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/957,684

(22) Filed: Oct. 5, 2004

(65) Prior Publication Data

US 2005/0134246 A1    Jun. 23, 2005

(30) Foreign Application Priority Data

Dec. 19, 2003   (JP) ............................. 2003-422294

(51) Int. Cl.
  *G05F 3/16*        (2006.01)
(52) U.S. Cl. ...................... 323/314; 327/540; 365/226
(58) Field of Classification Search ................ 323/304,
  323/311–314; 327/538, 540, 563; 365/189.09,
  365/189.11, 207, 226
See application file for complete search history.

(56) References Cited

U.S. PATENT DOCUMENTS

| 4,707,667 A |   | 11/1987 | Bertsch |        |
|-------------|---|---------|---------|--------|
| 6,184,726 B1 | * | 2/2001 | Haeberli et al. | ............... 327/96 |
| 6,333,864 B1 | * | 12/2001 | Nishimura et al. | ........... 363/78 |
| 6,737,906 B1 | * | 5/2004 | Senda et al. | ................. 327/535 |

FOREIGN PATENT DOCUMENTS

| JP | 58-135487 | 8/1983 |
| JP | 60-142610 | 7/1985 |
| JP | 60-198915 | 10/1985 |
| JP | 62-261205 | 11/1987 |
| JP | 5-129848 | 5/1993 |
| JP | 6-125228 | 5/1994 |
| JP | 11-330874 | 11/1999 |

* cited by examiner

*Primary Examiner*—Gary L Laxton
(74) *Attorney, Agent, or Firm*—McDermott, Will & Emery LLP

(57) ABSTRACT

A differential amplifier is used to determine the level of an output voltage of a charge pump circuit, and is operated in the voltage follower mode with a reference voltage being an input thereto for charging a capacitance element with a resultant output voltage of the amplifier circuit. Subsequently, a voltage to be compared that corresponds to the output voltage of the charge pump circuit is compared with the voltage stored in the capacitance element to generate an output signal by the differential amplifier. According to this output signal of the differential amplifier, the charge pump operation of the charge pump circuit is selectively activated. A power supply circuit is provided which stably generates an internal voltage at a desired voltage level.

3 Claims, 5 Drawing Sheets

VOLTAGE GENERATION CIRCUIT

BACKGROUND OF THE INVENTION

1. Field of the Invention

The present invention relates to a voltage generation circuit for internally generating a voltage at a desired voltage level. In particular, the present invention relates to a configuration of a power supply circuit generating for an internal power supply voltage differing in voltage level from an external power supply voltage through use of charge pumping operation of a capacitance element.

2. Description of the Background Art

A voltage at a different voltage level from that of a voltage provided from a system power supply is often required in semiconductor devices. For example, in a nonvolatile memory, a positive voltage and a negative voltage are required for programming and erasing data. In a display device, a positive voltage or a negative voltage is transmitted onto a gate line for selecting a pixel displaying element such as a liquid-crystal element. In these cases, a voltage (internal voltage) at a required voltage level is generated from an available power supply voltage in the semiconductor device and is supplied as a power supply voltage to an internal circuit. The internal circuit uses this internal voltage as an operating power supply voltage to drive an associated signal line or node to the level of the internal voltage.

An internal voltage generation circuit for generating an internal voltage from an externally supplied power supply voltage is generally configured of a charge pump circuit using charge pump operation of a capacitance element. In the charge pump circuit, positive or negative charges are supplied to an electrode node of the capacitance element according to a repetitive signal such as a clock signal and charged positive or negative charges are transferred to an output node to generate an internal voltage at a desired positive or negative voltage level. Such an internal voltage generation circuit using the charge pump operation of the capacitance element is widely employed as an internal power supply circuit for a driving circuit of a display device and an integrated circuit.

The internal power supply circuit or internal voltage generation circuit is required, in view of a stable operation of a load circuit consuming the internal voltage such as an internal circuit, to supply a voltage at a stable and constant voltage level to the load circuit. In order to stabilize the voltage level, a configuration as described below is usually employed for the internal power supply circuit or internal voltage generation circuit. Specifically, the level of an output voltage of the charge pump circuit is monitored and the charge pump operation is selectively activated according to the result of monitoring. Through the selective activation of the charge pump operation, charges are supplied when the absolute value of the internal voltage becomes smaller than a target voltage, to maintain the internal voltage at the target voltage level.

For monitoring the voltage level as described above, a comparison circuit is usually employed which compares a reference voltage with the output voltage of the charge pump circuit. According to an output signal of this comparison circuit, activation/inactivation of the charge pump operation is controlled. The reference voltage level is set to a constant voltage level independent of temperature and manufacturing parameters, so that the level of the internal voltage (internal power supply voltage) produced by the charge pump circuit can stably be maintained at a voltage level determined by the reference voltage.

As the comparison circuit for detecting the voltage level of the internal voltage, a differential amplifier (operational amplifier) may possibly be used. The differential amplifier includes a differential stage receiving the reference voltage and the internal voltage and a current mirror stage setting a drive current of the differential stage. A difference in conductance occurs between paired transistors of the differential stage according to the difference between the internal voltage and the reference voltage, and the level of the output voltage is determined by the difference in conductance and the charging or discharging drive current produced by the current mirror stage.

In the case where the paired transistors of the differential stage are formed of MOS transistors (insulated gate field effect transistors), the amount of the drive current for the paired transistors of the differential stage is mainly determined by the gate-to-source voltage on the condition that the threshold voltages are identical to each other. Thus, between the paired transistors of the differential stage, a difference in amount of drive current can accurately be produced according to the difference between the internal voltage and the reference voltage.

Due to variations of parameters or misalignment of the mask in the manufacturing process for example, however, a difference arises in threshold voltage between the transistors of the input differential stage, resulting in an offset voltage mainly because of the difference in threshold voltage. The offset voltage represents a deviation of voltage from "virtual short-circuit" state of input terminals of the differential amplifier in an ideal state.

When such an offset voltage exists, the difference between the internal voltage and the reference voltage cannot accurately be detected and thus the internal voltage cannot be maintained at a desired voltage level. Consequently, an operating margin of a load circuit receiving the internal voltage as an operating power supply voltage deteriorates. In particular, for a liquid crystal display device or the like, if the voltage level of a signal driving a gate line, connected to transistors selecting a liquid crystal element, deviates from a target value, a voltage corresponding to display pixel data cannot accurately be generated in the liquid crystal element, resulting in deteriorated display quality.

In addition, a display panel of the liquid crystal device uses a glass substrate as an insulative substrate and accordingly a low-temperature polysilicon TFT (thin film transistor) is employed as a transistor element. Therefore, annealing of the transistor element is insufficient, variation of the threshold voltage attains such a large magnitude as several hundreds mV, and accordingly the magnitude of the offset voltage of the differential amplifier becomes a significant magnitude.

The reference voltage is required of precision. Therefore, the reference voltage is usually generated by a high-precision reference voltage generation circuit based on a power supply voltage. If a required internal voltage is higher than or different in polarity from the reference voltage which can be generated by the reference voltage generation circuit, the internal voltage is level-converted through resistance division for example, to generate a voltage to be compared (hereinafter referred to as comparative voltage) corresponding to the reference voltage level. Further, in order to perform the comparison (differential amplification) in the most sensitive operating region of the differential amplifier, the internal voltage is level-converted (level-shifted) as described above. When the internal voltage is level-converted into a comparative voltage by a resistance division circuit, the offset voltage multiplied by the reciprocal of the resistance division factor is superimposed on the output voltage, resulting in an increased error in comparison/level determination.

Some conventional arts disclose a configuration for suppressing the influences of the offset voltage of the differential amplifier (operational amplifier) on the output voltage, in which the offset voltage is charged and stored on a capacitor and the voltage stored in the capacitor is utilized when operational amplification is performed, to cancel the influence of the offset voltage onto the output voltage. Specifically, in the conventional art, basically the following configuration is employed: the differential amplifier is operated in a voltage follower mode with an input signal being grounded, the capacitor is charged with the output voltage, and the negatively fed back offset voltage is used when differential amplification is performed, to cancel the offset voltage for generating the output voltage.

Specifically, Japanese Patent Laying-Open No. 58-135467 discloses a configuration of a voltage comparison circuit utilizing an operational amplifier. According to this prior art, the differential voltage between two input voltages is sampled by a capacitor, and concurrently, the operational amplifier is operated in the voltage follower mode and an offset voltage relative to a ground voltage is stored in an offset-compensation capacitor. In a comparison operation, the sampling capacitor is connected in series with the offset-compensation capacitor storing the reverse voltage of the offset voltage, a voltage shift of the offset voltage is caused through capacitive coupling in the sampling capacitor and then the potential on one electrode of the sampling capacitor is compared with the ground voltage. The operational amplifier has its positive input grounded, and has its negative input supplied with the voltage at a voltage level having the offset voltage compensated for, and generates a binary signal according to the input signal.

In the configuration of the above-described prior art, two capacitors, or the sampling capacitor for sampling two input voltages and the offset-compensation capacitor for compensating for the offset voltage, are necessary, resulting in an increased area occupied by the level determination section. Further, in the configuration of this prior art, the positive input of the operational amplifier is grounded all the time, the voltage of the signal applied to the negative input is shifted in the reverse direction to the offset voltage, and the signal voltage at the positive input is equivalently shifted by the offset voltage to compensate for the offset. In this prior art, no consideration is given on how the offset voltage is compensated for when the signal is supplied to the positive input. Further, no consideration is given on how the signal indicative of the bi-level determination result is used.

Japanese Patent Laying-Open No. 62-261205 discloses a configuration, in which an operational amplifier is operated in a voltage follower mode, an offset voltage negatively fed back is stored in a capacitance element. A first signal is applied to a positive input and a second signal is transmitted via the capacitance element to a negative input when differential amplification is performed. This prior art merely intends to perform an offset-voltage-compensation upon the differential amplification and gives no consideration on how the output signal is to be used.

Japanese Patent Laying-Open No. 60-142610 discloses a configuration, in which upon detection of an offset voltage, the operational amplifier is operated in the voltage follower mode with differential input being short-circuited and the reference voltage being applied and an output voltage thereof is stored in a capacitance element. When a comparison is made, the differential input is separated to receive a differential signal. In this operation, an input signal is transferred to the negative input via the capacitance element. The configuration of this prior art is similar to that of Japanese Patent Laying-Open No. 62-261205, and gives no consideration on how the output signal is to be used.

Japanese Patent Laying-Open No. 60-198915 discloses that the difference between differential input potentials of a target reference voltage and an input signal is sampled by a sampling capacitance element, and a differential amplifier operates in the voltage follower mode according to a reference power supply voltage from a reference power supply, to store an output signal voltage in a compensation capacitance element. When a comparison is made, one electrode of the sampling capacitor is coupled to the reference power supply, the other electrode of the sampling capacitor is coupled to the negative input of the differential amplifier, and the compensation capacitance element has charge-storing electrode coupled to the reference power supply and the other electrode coupled to the positive input. The sum of the offset voltage and the differential voltage of the differential signal is applied to the differential input, to cancel an influence of the offset of the operational amplifier. In this prior art configuration, the difference between the target reference voltage and the input signal is amplified, and the difference between the reference voltage and the input signal is detected by the sampling capacitor. Therefore, two capacitance elements, or the sampling capacitance element and the offset-compensation capacitance element are required. In addition, this prior art is silent with how the output signal is to be used.

Japanese Patent Laying-Open No. 11-330874 discloses a configuration, in which an operational amplifier is operated in the voltage follower mode, an offset voltage is stored in a level-keeping capacitance element coupled to the negative input, and an input signal is applied to the positive input when amplification is made, to cancel the offset. This prior art merely discloses the use of the operational amplifier as an amplifier at the initial input stage of a radio communication apparatus and is silent with the configuration for using the output signal of the operational amplifier for controlling operations of other circuitry.

Japanese Patent Laying-Open No. 5-129848 discloses a configuration, in which a differential input is short-circuited with a signal of the same voltage level being applied thereto when offset compensation is performed, and current flowing through differential transistors of a differential amplifier is adjusted so that the output signal is equal to a reference voltage (a half power supply voltage). According to this prior art, the voltage corresponding to an input threshold voltage of a circuit in the subsequent stage is used as the reference voltage, and a reference for an offset-compensated voltage is set to a voltage level corresponding to the input threshold voltage of the subsequent circuit. This prior art intends to compensate for the offset voltage of the differential amplifier, but is silent with an operation to be carried out by the circuit in the subsequent stage.

Japanese Patent Laying-Open No. 6-125228 discloses a configuration, in which two-stage differential amplifiers are operated in the voltage follower mode, respective output voltages of the amplifier of the first stage and the amplifier of the second stage are stored in first and second capacitance elements provided at the input and the output of the second-stage differential amplifier. In a comparison operation, the second capacitance element is coupled to the negative input of the first-stage amplifier and a reference voltage is applied to the negative input of the second-stage amplifier. While this prior art also discloses the configuration of compensating for the offset voltage of the differential amplifiers by the voltage stored in the capacitance elements, a reference voltage after D/A conversion is supplied as the reference voltage, and the differential amplifiers are used as comparison circuitry of an A/D conversion circuit of successive comparison type. This prior art reference is silent with the use of the output signal as a control signal for other circuit.

These prior arts as described above give no consideration on the fact that the offset voltage is amplified when the voltage to be compared is level-converted by the resistance-division circuit, and therefore give no consideration on the configuration of suppressing influences of the offset voltage in the case when the offset voltage is amplified.

SUMMARY OF THE INVENTION

An object of the present invention is to provide internal voltage generation circuitry capable of stably generating an internal voltage at a desired voltage level.

Another object of the present invention is to provide internal voltage generation circuitry including a level determination circuit capable of determining the level of an internal voltage without being influenced by an offset of a differential amplifier.

Internal power supply circuitry according to the present invention includes a differential amplifier having a first input and a second input, an internal voltage generation circuit for generating, when activated, an internal voltage in accordance with charge pump operation of a capacitance element, a compensation capacitance element connected to the first input of the differential amplifier, a first switch circuit for selectively transmitting one of a reference voltage and a comparative voltage corresponding to the internal voltage to the second input of the differential amplifier circuit, and a second switch circuit for connecting, when turned on, an output of the differential amplifier and the first input. When the second switch circuit is turned on, the first switch circuit selects the reference voltage and provides the reference voltage to the second input of the differential amplifier circuit. When the first switch selects the comparative voltage, the second switch circuit is set to a non-conductive state.

When the second switch is turned on, the differential amplifier circuit operates in the voltage follower mode. In this operation, the reference voltage is supplied via the first switch circuit to the differential amplifier. Accordingly, an offset voltage with respect to this reference voltage is stored in the capacitance element. When the level of the internal voltage is to be determined, the first switch circuit selects the comparative voltage and differential amplification is performed on the comparative voltage and the voltage stored in the capacitance element. An output voltage with the offset voltage cancelled is generated. Without an influence of the offset voltage, a signal indicating the result of determination of the internal voltage level can be generated. Thus, the level of the internal voltage can be accurately determined to control the operation of generating the internal voltage so that the internal voltage at a desired voltage level can stably be generated.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

First Embodiment

Figure 1:
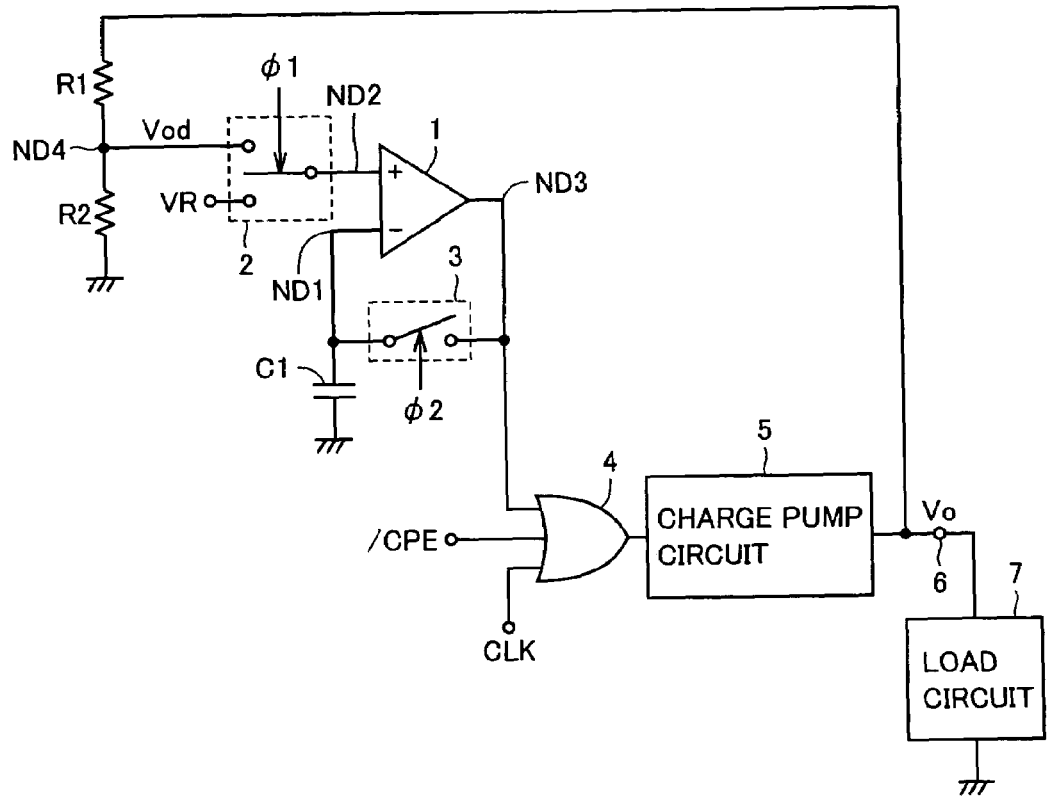
FIG. 1 schematically shows a configuration of a power supply circuit according to a first embodiment of the present invention.

FIG. 1 schematically shows a configuration of internal voltage generation circuitry according to a first embodiment of the present invention. The internal voltage generation circuitry shown in FIG. 1 is a power supply circuit for supplying, as an operating power supply voltage, an output voltage Vo via an output line (power supply line) 6 to a load circuit 7. The internal voltage generation circuitry is referred to and described as power supply circuit in the following description.

The power supply circuit includes: a differential amplifier (comparison circuit) 1 having a positive input (+; second input) and a negative input (−; first input) and differentially amplifying the signals applied to the negative input node ND1 and the positive input node ND2 to output a signal indicative of the result of differential amplification to an output node ND3; resistance elements R1 and R2 connected in series between output line 6 and a basic potential node (ground node); a switch circuit 2 for selecting, according to a control signal φ1, one of a voltage Vod on a connection node ND4 of resistance elements R1 and R2 and a reference voltage VR to transmit the selected one to positive input node ND2; a capacitance element (compensation capacitance element) C1 connected between negative input node ND1 of differential amplifier 1 and the ground node; and a switch circuit 3 for electrically coupling output node ND3 and negative input node ND1 of differential amplifier 1 in accordance with a control signal φ2.

A resistance division circuit comprised of resistance elements R1 and R2 generates a voltage to be compared, or comparative voltage Vod, by resistance-dividing output voltage Vo with a resistance ratio between resistance elements R1 and R2. This comparative voltage Vod is represented by the following expression:

$$Vod = Vo \cdot R2/(R1+R2),$$

where respective resistance values of resistance elements R1 and R2 are indicated by the same reference characters R1 and R2. Here, the voltage level of a basic voltage node to which resistance element R2 is coupled is 0 V.

The power supply circuit further includes: an OR circuit 4 receiving an output signal of differential amplifier 1, a comparison enable signal /CPE and a repetitive signal CLK; and a charge pump circuit 5 for supplying charges to output line 6 according to charge pump operation of a capacitance element included therein in response to an output signal of OR circuit 4 to generate an output voltage. The internal voltage generation circuitry is comprised of OR circuit 4 and charge pump circuit 5.

When the output signal of OR circuit 4 is a signal corresponding to repetitive signal CLK, charge pump circuit 5 performs precharge/charge pump operation internally to supply charges to output line 6. In the first embodiment, positive charges are supplied from charge pump circuit 5 to output line 6 and therefore output voltage Vo is a positive voltage.

Figure 2:
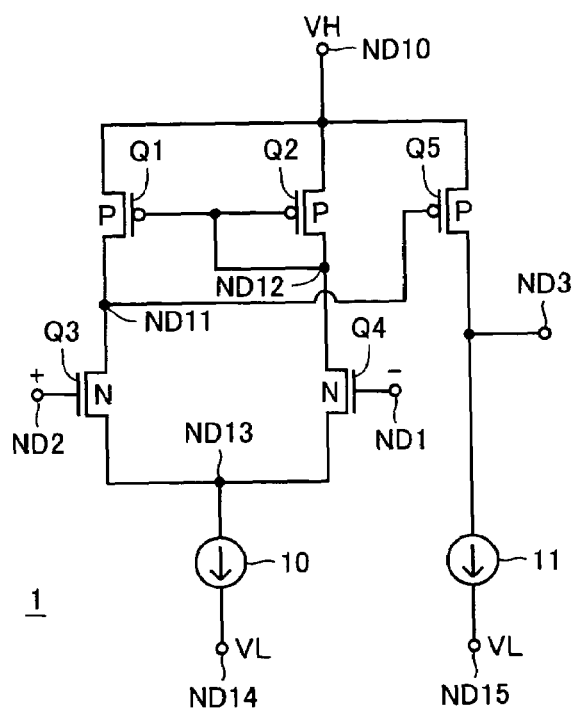
FIG. 2 shows an exemplary configuration of a differential amplifier shown in FIG. 1.

FIG. 2 shows an exemplary configuration of differential amplifier 1 shown in FIG. 1. Referring to FIG. 2, differential amplifier 1 includes: a P channel MOS transistor (insulated gate field effect transistor) Q1 connected between a high-side power supply node ND10 and an internal node ND11 and having its gate connected to an internal node ND12; a P channel MOS transistor Q2 connected between high-side power supply node ND10 and internal node ND12 and having its gate connected to internal node ND12; an N channel MOS transistor Q3 connected between internal node ND11 and an internal node ND13 and having its gate connected to positive input node ND2; an N channel MOS transistor Q4 connected between internal node ND12 and internal node ND13 and having its gate connected to negative input node ND1; a constant current source 10 connected between internal node ND13 and a low-side power supply node ND14; a P channel MOS transistor Q5 connected between high-side power supply node ND10 and output node ND3 and having its gate connected to internal node ND11; and a constant current source 11 connected between output node ND3 and a low-side power supply node ND15.

A high-side power supply voltage VH is supplied to high-side power supply node ND10 while a low-side power supply voltage VL is supplied to low-side power supply nodes ND14 and ND15. These low-side power supply nodes ND14 and ND15 may be a common node.

In differential amplifier 1 shown in FIG. 2, MOS transistors Q1 and Q2 constitute a current mirror type load with MOS transistor Q2 serving as a master, and MOS transistors Q3 and Q4 constitute a differential stage. When the level of the voltage on positive input node ND2 is higher than that on negative input node ND1, the conductance of MOS transistor Q3 becomes larger than that of MOS transistor Q4. MOS transistor Q2 supplies a drive current of MOS transistor Q4 and the current identical in magnitude to the current flowing through MOS transistor Q2 flows via MOS transistor Q1 and is discharged via MOS transistor Q3. Accordingly, the level of the voltage on internal node ND11 lowers, the conductance of MOS transistor Q5 increases to drive a current larger in amount than the drive current of constant current source 11, so that a signal from output node ND3 attains a high level (logical high level: H level).

On the contrary, when the level of the voltage on positive input node ND2 is lower than that on negative input node ND1, the conductance of MOS transistor Q4 becomes larger than that of MOS transistor Q3, and current larger than that flowing through MOS transistor Q3 flows through MOS transistor Q4. In this state, MOS transistor Q3 cannot discharge all the current supplied from MOS transistor Q1, so that the level of the voltage on internal node ND11 increases, the conductance of MOS transistor Q5 decreases and the amount of the drive current thereof decreases. When the drive current of MOS transistor Q5 becomes smaller in amount than the drive current of constant current source 11, the level of the voltage from output node ND3 attains a low level (logical low level: L level).

MOS transistors Q3 and Q4 constituting the differential stage have their respective source nodes commonly coupled to internal node ND13. Therefore, when these MOS transistors Q3 and Q4 have the same threshold voltage, an output voltage can accurately be generated on output node ND3 according to the difference between the voltages applied to positive input node ND1 and negative input node ND2. Due to variations of manufacturing parameters and others, however, these MOS transistors Q3 and Q4 have different threshold voltages. The difference between the threshold voltages contributes to an offset for the voltage difference appearing between positive input node ND1 and negative input node N2, and thus, serves as a main factor for the generation of the offset voltage in the differential amplifier.

The offset voltage in differential amplifier 1 is cancelled using capacitance element C1 shown in FIG. 1.

It is noted that high-side power supply voltage VH and low-side power supply voltage VL need only to have respective levels that allow differential amplification to be performed at the voltage level of reference voltage VR and allow a voltage of a similar level to that of reference voltage VR to be generated in the voltage follower mode operation. High-side voltage VH is thus required to be at a level of at least reference voltage VR, and low-side power supply voltage VL and high-side power supply voltage VH are set to the levels allowing OR circuit 4 to perform a binary operation.

Figure 3:
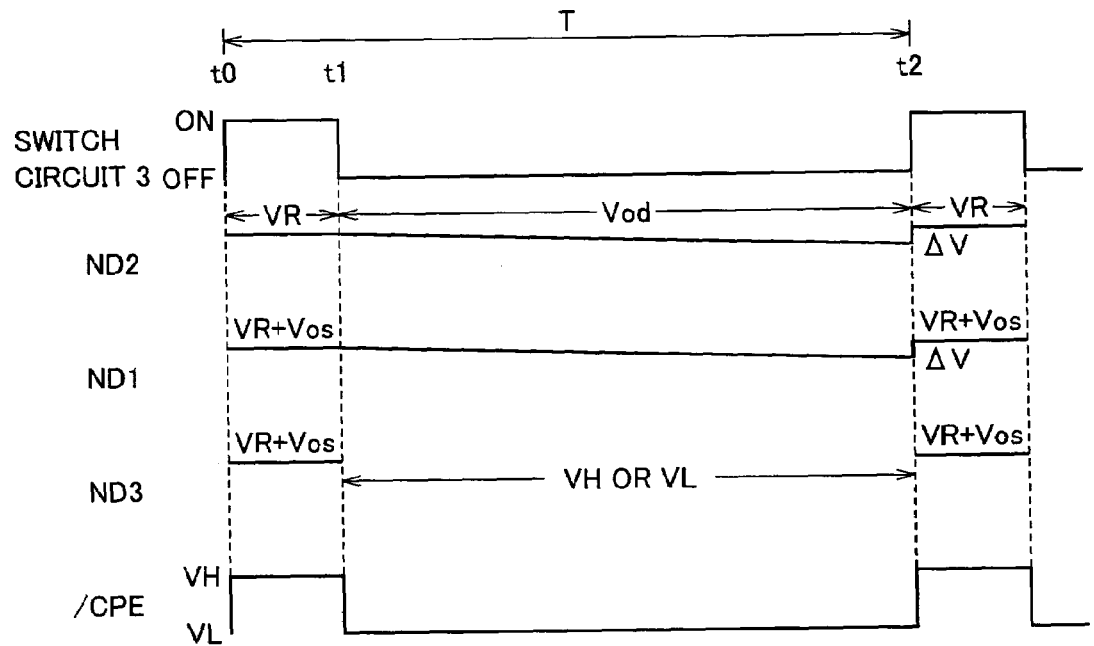
FIG. 3 is a signal waveform diagram representing an operation of the power supply circuit shown in FIG. 1.

FIG. 3 is a signal waveform diagram representing an operation of the power supply circuit in FIG. 1. Referring to FIG. 3, the operation of the power supply circuit shown in FIG. 1 will now be described.

Figure 4:
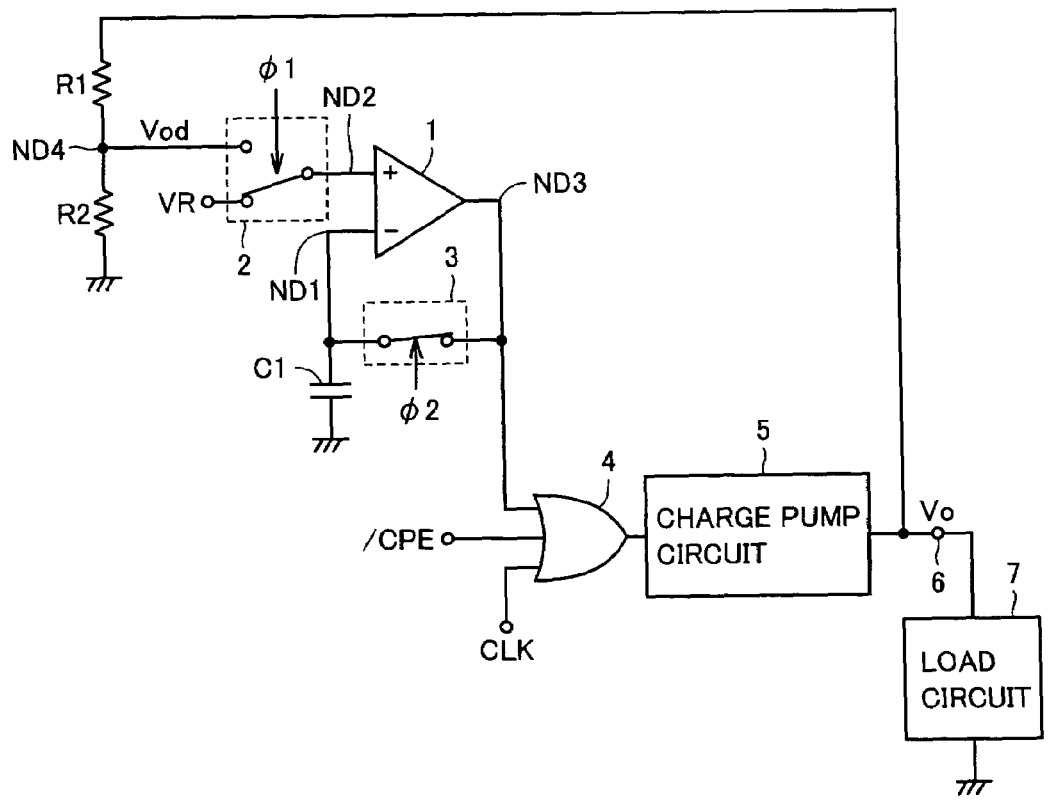
FIG. 4 shows connection when a reference voltage is refreshed in the power supply circuit shown in FIG. 1.

At time t0, comparison enable signal /CPE rises from L level (level of low-side power supply voltage VL) to H level (level of high-side power supply voltage VH) and control signal φ2 is activated. In response to the activation of control signal φ2, switch circuit 3 shown in FIG. 1 turns conductive, so that negative input node ND1 and output node ND3 of differential amplifier 1 are electrically connected together. As for switch circuit 2, switch circuit 2 selects reference voltage VR according to control signal φ1 of which logic level similarly changes. In this state, as shown in FIG. 4, differential amplifier 1 operates in the voltage follower mode. Further, on output node ND3 and negative input node ND1, a voltage corresponding to reference voltage VR supplied to positive input node ND2 is generated. Because of the presence of an offset voltage Vos of differential amplifier 1, the sum of reference voltage VR and offset voltage Vos of differential amplifier 1, or voltage VR+Vos, is generated, and this voltage VR+Vos on node ND1 is stored in capacitance element C1.

When comparison enable signal /CPE is at H level, the output signal of OR circuit 4 is at H level, so that transmission of repetitive signal CLK to charge pump circuit 5 is prohibited and accordingly charge pump circuit 5 stops the charge pumping operation.

Specifically, in the period in which the offset voltage of differential amplifier 1 is detected and set, differential amplifier 1 operates in the voltage follower mode so that a voltage taking the offset voltage into account is stored in capacitance element C1 and the voltage level of negative input node ND1 is shifted by the offset voltage of differential amplifier 1.

Figure 5:
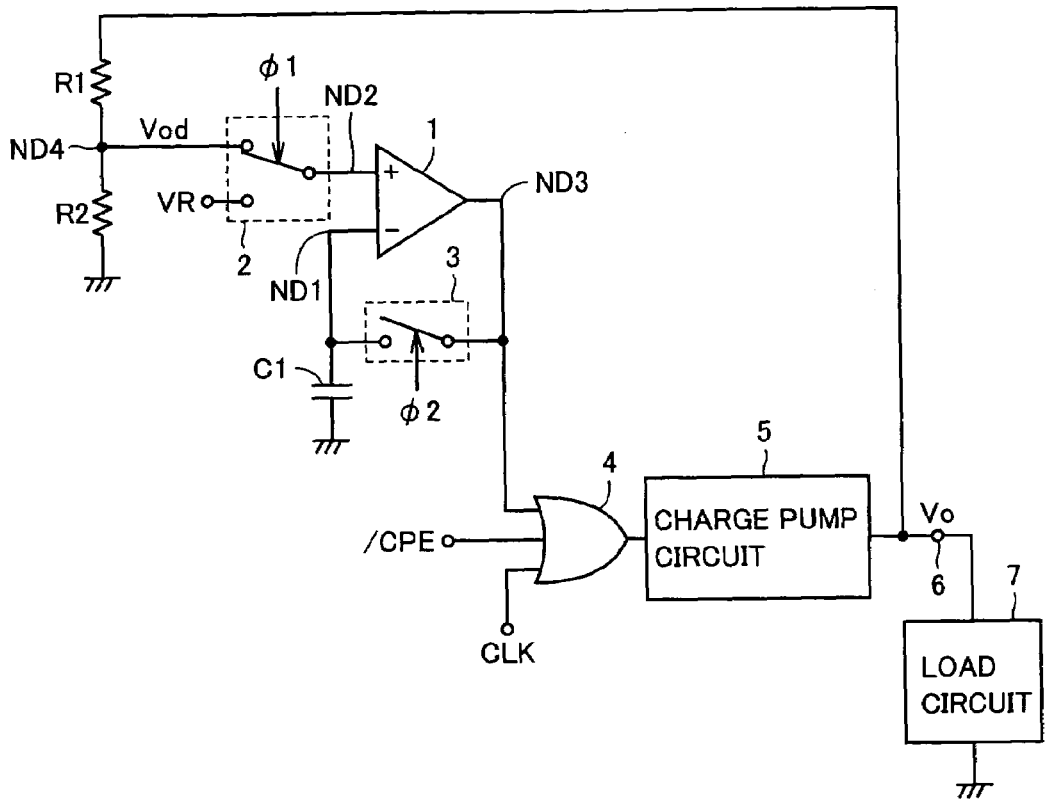
FIG. 5 shows connection when the voltage level is detected in the power supply circuit shown in FIG. 1.

At time t1, comparison enable signal /CPE falls to L level and control signal $\phi2$ is inactivated so that switch circuit 3 turns non-conductive. Switch circuit 2 selects comparative voltage Vod from connection node ND4 according to control signal $\phi1$. In this state, as shown in FIG. 5, negative input node ND1 and output node ND3 of differential amplifier 1 are isolated from each other. Differential amplifier 1 then performs differential amplification on comparative voltage Vod supplied to positive input node ND2 and the voltage on negative input node ND1 (the voltage stored in capacitance element C1), and generates a signal according to the amplification result on output node ND3. In this comparison operation, the voltage corresponding to the sum of reference voltage VR and offset voltage Vos is stored in capacitance element C1. Therefore, comparative voltage Vod applied to positive input node ND2 is made relatively lower by the voltage level of this offset voltage Vos. The differential input voltage to differential amplifier 1 is thus made Vod−(VR+Vos). Because of the presence of offset voltage Vos of differential amplifier 1, the relative amount of the shift of voltage Vod applied to positive input node ND2 is cancelled by the offset voltage of differential amplifier 1, so that a signal corresponding to the difference between reference voltage VR and input voltage Vod, or Vod−VR, is outputted to output node ND3.

When differential amplifier 1 performs a binary or bi-level determination operation, if comparative voltage Vod is higher than reference voltage VR, a signal of H level is generated on output node ND3 and if comparative voltage Vod is lower than reference voltage VR, a signal of L level is generated on output node ND3. Alternatively, differential amplifier 1 may perform differential amplification in an analog fashion and OR circuit 4 may perform b-level determination of the output signal of the differential amplifier 1 in accordance with its input logical threshold voltage.

When the signal on output node ND3 is at H level, the output signal of OR circuit 4 is fixed at H level so that transfer of clock signal CLK to charge pump circuit 5 is inhibited, and accordingly charge pump operation of charge pump circuit 5 is stopped. In contrast, when the signal on output node ND3 is at L level, OR circuit 4 operates as a buffer circuit (comparison enable signal /CPE is at L level) and repetitive signal CLK is transferred to charge pump circuit 5, and responsively, charge pump circuit 5 performs charge pump operation according to the transferred repetitive signal to supply positive charges to output line 6, to increase the voltage level of output voltage Vo. Through repletion of such operation, output voltage Vo on output line 6 attains a voltage level equal to the voltage level determined by reference voltage VR and the voltage division factor by resistance elements R1 and R2.

In the differential amplification by differential amplifier 1, comparative voltage Vod is compared with the voltage on negative input node ND1, or VR+Vos. In case where differential amplifier 1 is subject to no offset compensation and differentially amplifies reference voltage VR and comparative voltage Vod to control the charge pump operation, the output signal of differential amplifier 1 changes such that comparative voltage Vod becomes equal to the voltage VR+Vos. In this case, output voltage Vo of charge pump circuit 5 is represented by the following expression:

$$Vo=VR\cdot(1+R1/R2)+Vos\cdot(1+R1/R2).$$

When no offset compensation is made for differential amplifier 1, therefore, the output voltage Vo is set higher than the reference voltage VR by the voltage Vos·(1+R1/R2). In the case of a liquid crystal display device, for example, a power supply voltage VDD of the system containing the liquid crystal display device is used as reference voltage VR. This power supply voltage VDD assumes the value of the power supply voltage of an LSI (Large Scale Integrated circuit) generally used currently, or VR=VDD=3 (V). When 9 V is assumed for the level of output voltage Vo, which is at the level of the voltage used as a power supply voltage of the gate line driver of the liquid crystal display device, the output voltage Vo of 9 (V) can be obtained by setting R1/R2=2 in the case where the offset voltage of differential amplifier 1 is not taken into account. With this voltage division ratio, output voltage Vo has its level higher than the target voltage level by 3·Vos because of the presence of offset voltage Vos in differential amplifier 1.

However, when the reference voltage with offset voltage Vos of differential amplifier 1 taken into account is stored in capacitance element C1 and the voltage on negative input node ND1 is set to VR+Vos, the offset voltage component of differential amplifier 1 is cancelled by offset voltage component Vos stored in capacitance element C1. Therefore, comparative voltage Vod is compared with reference voltage VR and the logic level of the output signal of differential amplifier 1 is determined by the result of the comparison. In other words, differential amplifier 1 equivalently compares, due to the offset voltage, the voltage Vod+Vos supplied to positive input node ND2 with the voltage VR+Vos on negative input node N1, the components of offset voltages Vos are equivalently canceled with each other, and thus the level of the comparative voltage can accurately be determined to set output voltage Vo to a voltage level corresponding to reference voltage VR. In this case, output voltage Vo is represented by the following expression:

$$Vo=VR\cdot(1+R1/R2).$$

By forming resistance element R1 and R2 with the same material, variations in resistance due to the ambient temperature and manufacturing conditions are cancelled. By using reference voltage VR with an ensured voltage precision, output voltage Vo can accurately be set to a voltage level independent of the ambient temperature and manufacturing conditions.

The reference potential of differential amplifier 1 is held in capacitance element C1. Due to leakage current, the charges stored in capacitance element C are discharged and responsively the voltage level thereof decreases by ΔV. Consequently, as shown in FIG. 3, the operation of detecting and setting the offset voltage performed from time t0 to time t1 has to be repeated at a certain period T so as to refresh the reference potential. The period of detecting/setting the offset voltage (refreshing of the reference potential) is set to an appropriate value in consideration of a permissible voltage drop in output voltage Vo. In the case of a liquid crystal display device, for example, comparison enable signal /CPE is set to H level each time a horizontal scan period has passed (the reference potential is refreshed each horizontal scan period of time). Alternatively, the offset voltage may be detected and set to refresh the reference potential each vertical scan period.

In the case where repetitive signal CLK determines the transfer cycle of pixel data, the horizontal scan period or vertical scan period can be detected by counting this repetitive signal. Accordingly, the timing of activating/inactivating the refresh operation of the offset voltage can easily be set. Alternatively, in the case where repetitive signal CLK is a repetitive signal generated depending on charge pumping capability of charge pup circuit 5 by an internal oscillation circuit, the inactivation timing (L level period) of comparison enable signal /CPE may be determined according to a gate line drive timing signal (horizontal synchronization (drive) signal or vertical synchronization (drive) signal) to detect and set the offset voltage and refresh the reference potential.

When this power supply circuit is employed by a semiconductor device different from the liquid crystal display device, comparison enable signal /CPE may be generated based on an output signal of a timer that counts the repetitive signal CLK and determines the refresh period T shown in FIG. 3 and the timing of refreshing operation.

Figure 6:
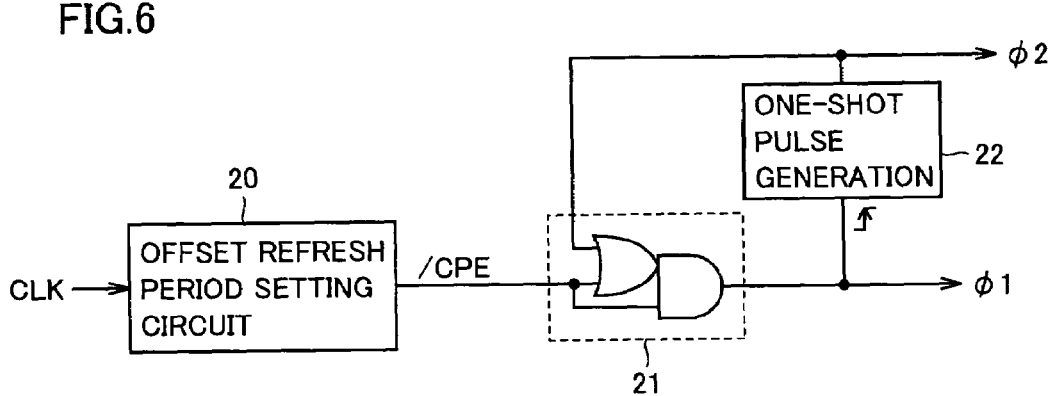
FIG. 6 schematically shows an exemplary configuration of a section for generating control signals shown in FIG. 1.

FIG. 6 shows an exemplary configuration of a section of generating the control signals $\phi1$ and $\phi2$ for controlling the switch circuits 2 and 3., In FIG. 6, a configuration for generating control signals $\phi1$ and $\phi2$ based on repetitive signal CLK is shown as an example.

Referring to FIG. 6, the switch control signal generation section includes an offset refresh period setting circuit for determining the refresh period for detecting and setting the offset voltage based on repetitive signal CLK to activate comparison enable signal /CPE at a predetermined cycle, a composite gate 21 for generating control signal $\phi1$ according to comparison enable signal /CPE and control signal $\phi2$, and a one-shot pulse generation circuit 22 for generating control signal $\phi2$ in a one-shot pulse form according to control signal $\phi1$.

Composite gate 21 equivalently includes an OR gate receiving control signal $\phi2$ and comparison enable signal /CPE and an AND gate receiving an output signal of this OR gate and comparison enable signal /CPE to output control signal $\phi1$.

Figure 7:
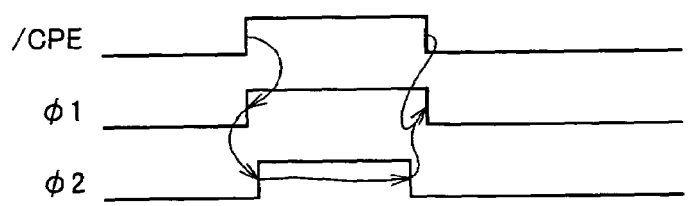
FIG. 7 is a signal waveform diagram representing an operation of the control signal generation section shown in FIG. 6.

FIG. 7 is a signal waveform diagram representing an operation of the switch control signal generation circuit shown in FIG. 6. Referring to FIG. 7, a description will now given on the operation of the switch control signal generation circuit shown in FIG. 6.

Offset refresh setting circuit 20 inactivates (sets to L level) comparison enable signal /CPE for a predetermined period of time at a predetermined cycle based on the count of repetitive signal CLK. In response to inactivation of comparison enable signal /CPE, control signal $\phi1$ from composite gate 21 attains H level and accordingly control signal $\phi2$ from one-shot pulse generation circuit 22 attains H level. When control signal $\phi1$ is at H level, switch circuit 2 shown in FIG. 1 selects reference voltage VR and switch circuit 3 turns conductive because control signal $\phi2$ is at H level.

When control signal $\phi2$ from one-shot pulse generation circuit 22 falls to L level after a predetermined period of time, switch circuit 3 shown in FIG. 3 is turned off to disconnect negative input node ND1 and output node ND3 of differential amplifier 1 from each other. The H level duration of control signal $\phi2$ is made shorter than the H level duration of comparison enable signal /CPE. When control signal $\phi2$ attains H level and comparison enable signal /CPE attains L level, control signal $\phi1$ from composite gate 21 turns L level, so that switch circuit 2 shown in FIG. 1 selects comparative voltage Vod.

After switch circuit 3 is turned off, switch circuit 2 is set to a state of selecting comparative voltage Vod. Thus, the voltage to be stored in capacitance element C1 can be set accurately to a voltage level with the offset voltage taken into account with respect to reference voltage VR.

Offset refresh period setting circuit 20 shown in FIG. 6, instead of the configuration using repetitive signal CLK, may be configured such that comparison enable signal /CPE is inactivated according to an output signal of a timer counting a predetermined time period based on another signal.

Figure 8:
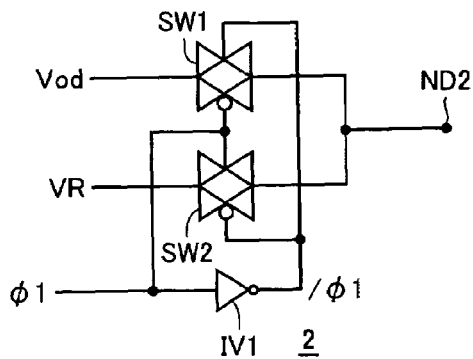
FIG. 8 shows an exemplary configuration of a positive input switch circuit shown in FIG. 1.

FIG. 8 shows an exemplary configuration of switch circuit 2 shown in FIG. 1. Referring to FIG. 8, switch circuit 2 includes an inverter IV1 receiving control signal $\phi1$ to generate inverted control signal /$\phi1$, a CMOS transmission gate SW1 selectively rendered conductive according to control signals $\phi1$ and /$\phi1$ to transmit, when conductive, comparative voltage Vod to positive input node ND2, and a CMOS transmission gate SW2 rendered conductive complementarily to CMOS transmission gate SW1 according to control signals $\phi1$ and /$\phi1$ to transmit, when conductive, reference voltage VR to positive input node ND2.

When control signal $\phi1$ is at H level, CMOS transmission gate SW2 is conductive while CMOS transmission gate SW1 is non-conductive. In this state, reference voltage VR is transmitted to positive input node ND2. When control signal $\phi1$ is at L level, CMOS transmission gate SW1 is conductive while CMOS transmission gate SW2 is non-conductive and thus comparative voltage Vod is transmitted to positive input node ND2.

Figure 9:
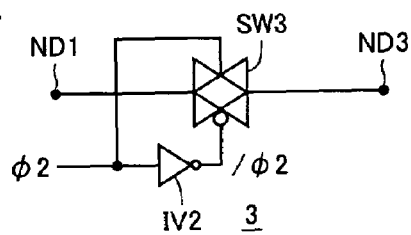
FIG. 9 shows an exemplary configuration of a negative-feedback switch circuit shown in FIG. 1.

FIG. 9 shows an exemplary configuration of switch circuit 3 shown in FIG. 1. Referring to FIG. 9, switch circuit 3 includes an inverter IV2 receiving control signal $\phi2$, and a CMOS transmission gate SW3 selectively rendered conductive according to inverted control signal /$\phi2$ output from inverter IV2 and control signal $\phi2$ to electrically couple, when conductive, negative input node ND1 to output node ND3.

When control signal $\phi2$ is at H level, CMOS transmission gate SW3 is rendered conductive and responsively, nodes ND2 and ND3 are electrically coupled together. When control signal $\phi2$ is at L level, CMOS transmission gate SW3 is rendered non-conductive and responsively, negative input node ND1 is electrically disconnected from output node ND3.

As shown in FIGS. 8 and 9, switch circuits 2 and 3 use their CMOS transmission gates so that the analog signal can surely be transmitted without signal loss, and the voltage for canceling the offset voltage of the differential amplifier can accurately be stored in capacitance element C1.

In the configuration as described above, during the refresh period of the reference potential for detecting and setting the offset voltage, comparison enable signal /CPE is used to fix the output signal of OR circuit 4 to H level and prohibit transfer of repetitive signal CLK to charge pump circuit 5. In this way, it is prevented that internal voltage Vo deviates from a target voltage level (increases in absolute value) due to self-running charge pumping operation in the refresh period of the reference voltage. However, in the period in which differential amplifier 1 is operated in the voltage follower mode, if any increase or decrease of the voltage level of output voltage Vo of charge pump circuit 5 is negligible, it is not particularly necessary to input comparison enable signal /CPE to OR circuit 4 (charge pump circuit 5 performs the charge pump operation in self-running fashion).

When power supply voltage VDD is used as reference voltage VR and high-side power supply voltage VH is higher than this power supply voltage VDD, if OR circuit 4 receives this power supply voltage VDD as an operating power supply voltage, the output signal of OR circuit 4 is fixed to H level during the refresh period of the reference potential and transfer operation of charge pump circuit 5 is prohibited even if comparison enable signal /CPE is not used. When reference voltage VR is at an intermediate voltage level between the high-side power supply voltage and the low-side power supply voltage of OR circuit 4, the voltage level of the output signal of OR circuit 4 is determined according to the input logic threshold voltage of OR circuit 4.

As discussed above, according to the first embodiment of the present invention, the offset voltage of the differential amplifier which determines the output voltage level is detected through the voltage follower mode operation thereof, and the offset-voltage-compensated reference voltage is stored in the capacitance element. Then, based on the voltage stored in the capacitance element and the comparative voltage, the level of the output voltage is determined to control the charge pumping operation for generating an internal voltage. Accordingly, without influence of the offset voltage of the level-determining differential amplifier, the level of the output voltage can accurately be determined to effect the charge pump operation and accordingly, the internal power supply voltage at a desired voltage level can stably be available.

Second Embodiment

Figure 10:
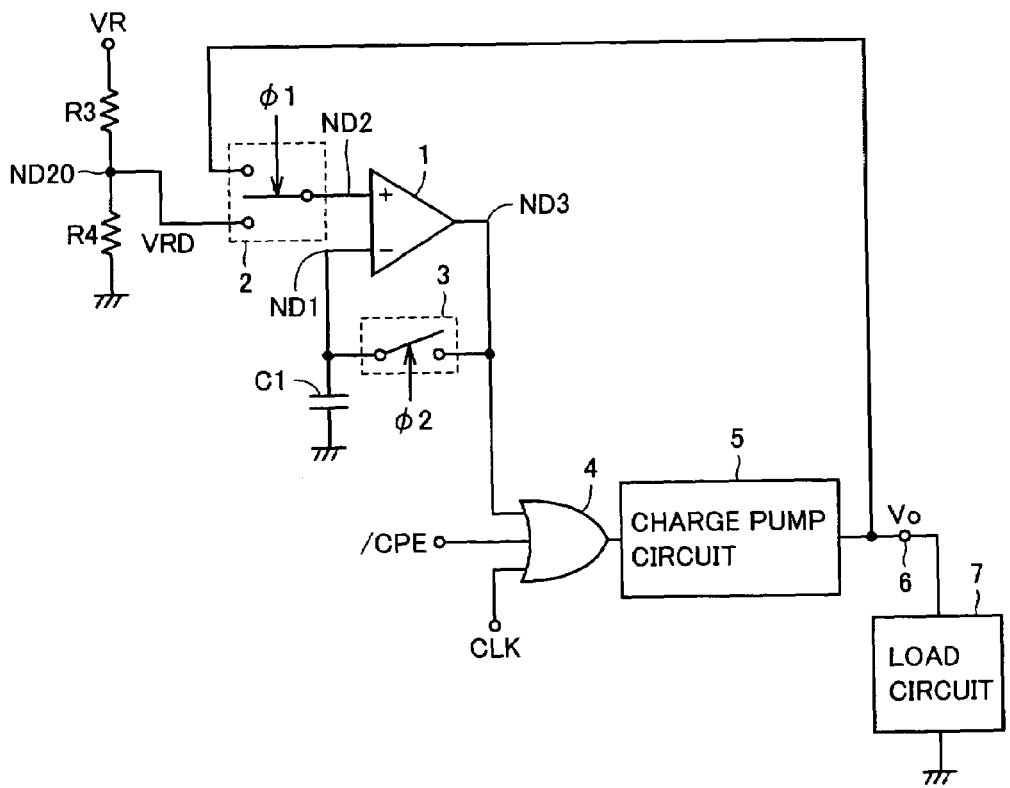
FIG. 10 schematically shows a configuration of a power supply circuit according to a second embodiment of the present invention.

FIG. 10 schematically shows a configuration of a power supply circuit according to a second embodiment of the present invention. The power supply circuit shown in FIG. 10 differs in configuration from the power supply circuit shown in FIG. 1 in that resistance elements R3 and R4 for dividing reference voltage VR are provided in series. To switch circuit 2, output voltage Vo of charge pump circuit 5 and the divided voltage VRD generated by this resistance division circuit are applied. The other configuration of the power supply circuit shown in FIG. 10 is identical to that of the power supply circuit shown in FIG. 1. Like components are thus denoted by like reference characters and the detailed description thereof will not be repeated.

Resistance elements R3 and R4 are connected in series between a reference voltage supply node and a ground node (basic potential source), and divided voltage VRD is output from a connection node ND20. This voltage VRD is represented by the following expression:

$VRD = VR/(1+R3/R4)$.

Switch circuit 2 selects one of divided voltage VRD and output voltage Vo of charge pump circuit 5 to transmit the selected one to positive input node ND2 of differential amplifier 1. When differential amplifier 1 operates in the voltage follower mode, a voltage VRD+Vos is stored on negative input node ND1. When differential amplifier 1 performs differential amplification, differential amplifier 1 compares output voltage Vo with the voltage VRD+Vos. Since differential amplifier 1 has offset voltage Vos, this offset voltage component is cancelled in the differential amplification, so that differential amplifier 1 outputs a signal according to the difference between divided voltage VRD and output voltage (internal power supply voltage) Vo. When output voltage Vo is higher than divided voltage VRD, the output signal of differential amplifier 1 attains H level and responsively charge pump operation of charge pump circuit 5 is prohibited. Conversely, when divided voltage VRD is higher than output voltage Vo, the output signal of differential amplifier 1 attains L level so that the charge pump operation of charge pump circuit 5 is activated to increase the voltage level of output voltage Vo. In other words, according to the output signal of differential amplifier 1, charge pump operation of charge pump circuit 5 is controlled such that output voltage Vo becomes equal to the voltage level of divided voltage VRD. Output voltage Vo is thus represented by the flowing expression:

$Vo = VRD = VR/(1+R3/R4)$.

With the configuration shown in FIG. 10, output voltage Vo at a desired voltage level can be generated even if output voltage Vo is lower than high-side power supply voltage VH or lower than system power supply voltage VDD (=VR). High-side power supply voltage VH is required to be at a voltage level equal to or higher than output voltage Vo. When reference voltage VR is equal to system power supply voltage VDD, this system power supply voltage can be used as high-side power supply voltage VH.

With the configuration of the power supply circuit shown in FIG. 10, reference voltage VR is generated by a reference voltage generation circuit of high voltage precision (a circuit generating a reference voltage independent of the temperature and the power supply voltage is used). By forming resistance elements R3 and R4 with the same material, the dependency of resistance elements R3 and R4 on the temperature and manufacturing conditions can be balanced out, so that divided voltage VRD can stably be generated. Thus, independent of the ambient temperature and manufacturing conditions, output voltage Vo at a desired level can be generated.

As discussed above, according to the second embodiment of the present invention, the reference voltage is resistance divided for use as a reference voltage for the output voltage. Accordingly, an output voltage lower than the reference voltage can accurately be set to a desired voltage level.

Through the use of divided voltage VRD and divided comparative voltage Vod by the combination of the configurations shown in FIGS. 10 and 1, the output voltage Vo can be set to any voltage level and in addition, the comparison can be made in the most sensitive region of differential amplifier 1. In this case, output voltage Vo is represented by the following expression:

$Vo = VR \cdot (1+R1/R2)/(1+R4/R3)$.

Third Embodiment

Figure 11:
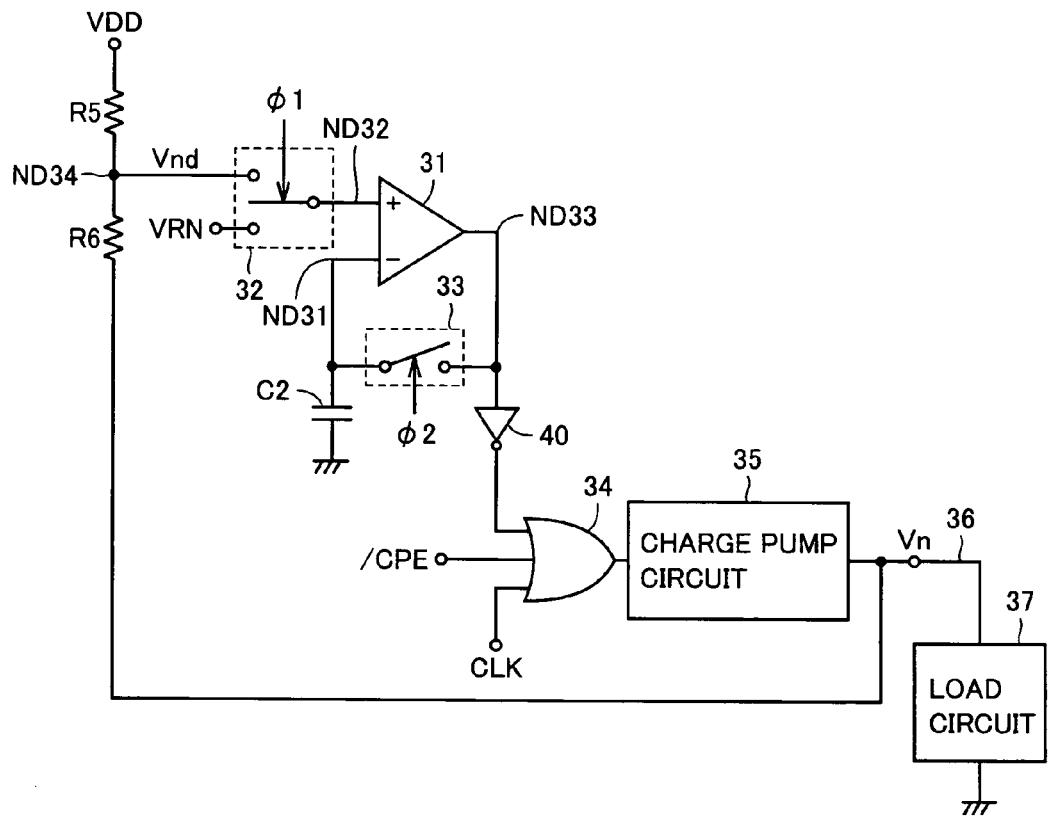
FIG. 11 schematically shows a configuration of a power supply circuit according to a third embodiment of the present invention.

FIG. 11 schematically shows a configuration of a power supply circuit according to a third embodiment of the present invention. The power supply circuit shown in FIG. 11 generates negative voltage Vn to supply this voltage to a load circuit 37 via an output line 36.

Referring to FIG. 11, the power supply circuit includes a differential amplifier 31 for comparing the voltages on a positive input node (second input node) ND32 and a negative input node (first input node) ND31 to generate a signal representing the result of comparison on an output node ND33, resistance elements R5 and R6 connected in series between a power supply node supplying power supply voltage VDD and output line 36 and generating divided voltage Vnd on a connection node ND34, a switch circuit 32 for selecting one of reference voltage VRN and divided voltage (comparative voltage) Vnd according to control signal φ1 to transmit the selected voltage to positive input node ND32, a capacitance element C2 connected between negative input node ND31 and a ground node, a switch circuit 33 for electrically coupling together an output node ND33 and negative input node ND31 of differential amplifier 31 according to control signal φ2, an inverter 40 receiving the signal on output node ND33 of differential amplifier 31, an OR circuit 34 receiving an output signal of inverter 40, comparison enable signal /CPE and repetitive signal CLK, and a charge pump circuit 35 selectively performing charge pump operation by a capacitance element according to an output signal of OR circuit 34 to generate a negative voltage Vn.

When activated, charge pump circuit 35 performs the charge pump operation by the internal capacitance element according to repetitive signal CLK to supply negative charges to output line 36 for generating negative voltage Vn.

Resistance elements R5 and R6 constitute a voltage division circuit. Divided voltage Vnd generated by resistance elements R5 and R6 as a voltage to be compared or the comparative voltage is represented by the following expression:

$$Vnd = (VDD - Vn) \cdot R6/(R5+R6)$$

In the power supply circuit shown in FIG. 11, the operations of detecting and setting the offset voltage of differential amplifier 31 and making a comparison are similar to those of the first embodiment. Specifically, when switch circuit 32 selects reference voltage VRN, switch circuit 33 is made conductive to electrically couple together output node ND33 and negative input node ND31 of differential amplifier 31. In this state, differential amplifier 31 operates in the voltage follower mode, so that a voltage VRN+Vos is produced on negative input node ND 31 and this voltage is stored as a reference voltage in capacitance element C2. Here, the offset voltage of differential amplifier 1 is represented by reference character Vos.

In comparison operation, switch circuit 33 is made non-conductive and switch circuit 32 selects divided voltage Vnd as the comparative voltage. Differential amplifier 31, the configuration of which will be described later, has offset voltage Vos and the voltage on positive input node ND32 is made equivalently Vnd+Vos. Then, differential amplifier 31 compares this voltage Vnd+Vos with reference voltage Vos+VRN stored in capacitance element C2 and the result of comparison is outputted to output node ND33. Thus, in the configuration shown in FIG. 11 as well, offset voltage Vos of the input voltage of differential amplifier 1 is cancelled, divided voltage Vnd and reference voltage VRN are compared with each other and a signal representing the result of comparison is generated on output node ND33.

The comparison made by differential amplifier 31 is similar to those in the above-described first and second embodiments. When differential amplifier 31 makes a bi-level determination, a signal of H level is generated onto output node ND33 when divided voltage Vnd is higher than reference voltage VRN. Conversely, if divided voltage Vnd is lower than reference voltage VRN, a signal of L level is generated onto output node ND33.

The output signal of differential amplifier 31 is inverted by inverter 40. Thus, when divided voltage Vnd is higher than reference voltage VRN, the output signal of inverter 40 attains L level, OR circuit 34 transmits repetitive signal CLK to charge pump circuit 35 to supply negative charges to output line 36, to decrease the voltage level of output voltage Vn.

When divided voltage Vnd is lower than reference voltage VRN, the output signal of inverter 40 attains H level, OR circuit 34 prohibits transfer of repetitive signal CLK and accordingly, prohibits the charge pump operation of charge pump circuit 35. Thus, the voltage level of negative output voltage Vn is maintained at a voltage level at which divided voltage Vnd is set equal to reference voltage VRN. Specifically, negative output voltage Vn is maintained at the voltage level that satisfies the following relation:

$$Vnd = VRN = (VDD - Vn) \cdot R6/(R5+R6).$$

The above expression is rearranged with Vn into the following relation:

$$Vn = VDD - VRN \cdot (1 + R5/R6).$$

In other words, regarding the power supply circuit for generating negative voltage Vn shown in FIG. 11, when the voltage level of output voltage Vn of charge pump circuit 35 is lower than the voltage level defined by reference voltage VRN, this negative voltage Vn is at a voltage level further lower than a predetermined voltage. In this condition, the charge pump operation is stopped. When negative voltage Vn is higher than the voltage level defined by reference voltage VRN, negative voltage Vn does not attain a predetermined voltage level. Therefore, the charge pump circuit 35 performs charge pump operation. In this way, negative voltage Vn at a desired voltage level can be generated.

In the configuration shown in FIG. 11, control signal /CPE determining the reference potential refreshing period for detecting and setting the offset voltage is set to H level during this period to stop the charge pump operation of charge pump circuit 35. If the voltage range, in which output voltage Vn varies in the period of detecting/setting the offset voltage, is within a tolerable range, however, it is unnecessary to supply comparison enable signal /CPE to the OR circuit, as in the first embodiment.

Control signals φ1 and φ2 can be generated by a configuration similar to the configuration of the control signal generation circuit used in the first embodiment.

Figure 12:
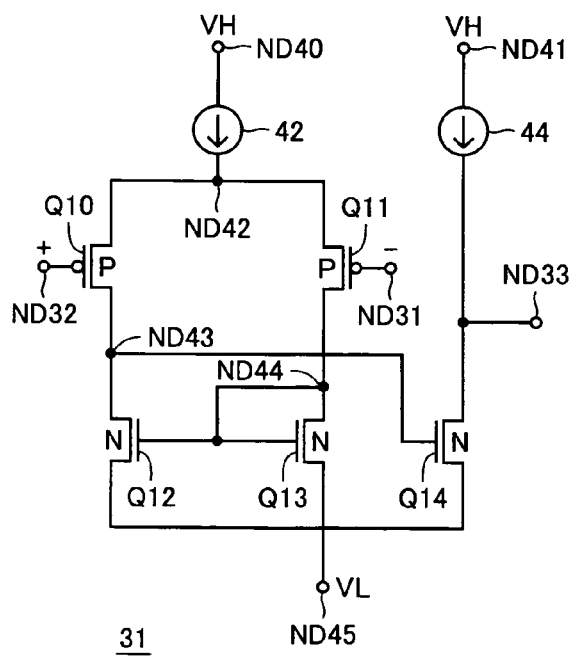
FIG. 12 shows an exemplary configuration of a differential amplifier shown in FIG. 11.

FIG. 12 shows an exemplary configuration of differential amplifier 31 shown in FIG. 11. Referring to FIG. 12, differential amplifier 31 includes a constant current source 42 connected between a high-side power supply node ND40 and an internal node ND42, a P channel MOS transistor Q10 connected between internal nodes ND42 and ND43 and having its gate connected to positive input node ND32, a P channel MOS transistor Q11 connected between internal nodes ND42 and ND44 and having its gate connected to negative input node ND31, an N channel MOS transistor Q12 connected between internal node ND43 and a low-side power supply node ND45 and having its gate connected to internal node ND44, an N channel MOS transistor Q13 connected between internal node ND44 and low-side power supply node ND45 and having its gate connected to internal node ND44, a constant current source 44 connected between a high-side power supply node ND41 and output node ND33, and an N channel MOS transistor Q14 connected between output node ND33 and low-side power supply node ND45 and having its gate connected to internal node ND43.

To high-side power supply nodes ND40 and ND41, high-side power supply voltage VH is supplied and low-side power supply voltage VL is supplied to low-side power supply node ND45. This high-side power supply voltage VH may be equal to or may be different from power supply voltage VDD. Further, low-side power supply voltage VL may be or may not be ground voltage. The voltage levels of voltages VH and VL are set depending on the voltage level of reference voltage VRN. Inverter circuit 40, OR circuit 34 and charge pump circuit 35 shown in FIG. 11 use, as operating power supply voltage, these high-side power supply voltage VH and low-side power supply voltage VL. Thus, charge pump circuit 35 accurately performs charge pump operation according to the voltage level of negative power supply voltage Vn to generate negative power supply voltage Vn at a desired voltage level.

In the configuration of the differential amplifier shown in FIG. 12, MOS transistors Q10 and Q11 constitute a differential stage while MOS transistors Q12 and Q13 constitute a current-mirror type load. When the voltage level of positive input node ND32 is higher than the voltage level of negative input node ND31, the conductance of MOS transistor Q10 becomes smaller than the conductance of MOS transistor Q11. Current of the same magnitude flows through MOS transistors Q12 and Q13 and current of the same magnitude as that of the current supplied to MOS transistor Q11 is discharged via MOS transistor Q13 to low-side power supply node ND45. MOS transistor Q12 therefore discharges all the current from MOS transistor Q10, and the voltage at internal node ND43 drops to a lower level, resulting in decreased conductance of MOS transistor Q14. When the conductance of MOS transistor Q14 decreases, the current from constant current source 44 cannot be discharged, so that the voltage level of node ND33 attains H level (level of high-side power supply voltage VH).

When the voltage level of positive input node ND32 is lower than the voltage level of negative input node ND31, the conductance of MOS transistor Q10 becomes larger than the conductance of MOS transistor Q11. Accordingly, the amount of drive current of MOS transistor Q10 is made larger than that of MOS transistor Q11. Current of the same magnitude as that of the drive current of MOS transistor Q11 is discharged through MOS transistor Q13, and mirror current of the same magnitude as the current flowing through MOS transistor Q13 flows through MOS transistor Q12. In this case, therefore, MOS transistor Q12 cannot discharge all the current supplied from MOS transistor Q10, resulting in an increased voltage level at node ND43. MOS transistor Q14 has the conductance increased to discharge all the current from constant current source 44. Through discharge by MOS transistor Q14 of all the drive curent from constant current source 44, the voltage level of output node ND33 attains L level (level of low-side power supply voltage VL).

Accordingly, output drive transistor Q14 can be used to selectively discharge the drive current of constant current source 44 so that signals of H level and L level can be outputted according to the voltage difference between positive input node ND32 and negative input node ND31.

It is noted that, in the configuration of differential amplifier 31 shown in FIG. 12, even if the voltages applied to positive input node ND32 and negative input node ND31 are each at a negative voltage level, an accurate comparison can be made.

Further, it is noted that, the power supply circuit shown in FIG. 11 may be configured such that differential amplifier 31 performs an amplifying operation in an analog manner and the output signal of the differential amplifier is subject to a bi-level determination based on the input logic threshold voltage of inverter 40.

Further, it is noted that for the power supply circuit shown in FIG. 11, when reference voltage VRN is at a negative voltage level, such a configuration, as in the second embodiment, can be employed that the negative reference voltage (VRN) is level-shifted by a resistance division circuit and negative output voltage Vn and the level-shifted reference voltage are compared by the differential amplifier. In this case, negative reference voltage VRN comes to have a negative voltage level lower than the negative voltage level of output voltage Vn. Low-side power supply voltage VL of differential amplifier 31 has to be a negative voltage since differential amplifier 31 has to operate in the voltage follower mode when the offset voltage is detected and set to store the reference potential for negative power supply voltage Vn in capacitance element C2. High-side power supply voltage VH may be power supply voltage VDD or may be ground voltage level.

As discussed above, according to the third embodiment of the present invention, even in the case where a negative voltage is to be generated, the offset voltage of the differential amplifier for determining the voltage level of the negative voltage is cancelled using the voltage stored in the capacitance element. In this way, the negative voltage at a desired voltage level can accurately be generated.

According to the present invention, the internal voltage generation circuitry can be used as a circuit for generating, in addition to a voltage used as a power supply voltage, an internal voltage at a desired voltage level. As discussed above, the internal voltage generation circuitry can be used as a circuit for generating a negative voltage and a positive voltage necessary for AC-driving the liquid crystal of a liquid crystal display device. In addition, the internal voltage generation circuitry can be used as a circuit in a general semiconductor device for generating an internal voltage at a desired voltage level which is different from a power supply voltage and a ground voltage. The internal voltage generation circuitry of the present invention can thus be employed as a circuit for generating an internal voltage at a desired voltage level, not limited to a power supply circuit.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. Voltage generation circuitry comprising:
a differential amplifier having a first input and a second input;
an internal voltage generation circuit selectively activated according to at least an output signal of said differential amplifier and generating, when activated, an internal voltage in accordance with charge pump operation of a capacitance element;
a compensation capacitance element connected to the first input of said differential amplifier;
a first switch circuit selectively transmitting one of a reference voltage and a comparative voltage corresponding to said internal voltage to the second input of said differential amplifier circuit; and
a second switch circuit for connecting, when conductive, an output of said differential amplifier circuit and said first input together, said first switch circuit selecting and supplying said reference voltage to the second input of said differential amplifier when said second switch circuit is conductive, and said second switch circuit being rendered non-conductive when said first switch circuit selects the comparative voltage.

2. The voltage generation circuitry according to claim 1, wherein
said internal voltage generation circuit includes
a gate circuit for selectively transmitting a clock signal in accordance with the output signal of said differential amplifier circuit, and
a charge pump circuit having a charge pump operation selectively activated according to an output signal of said gate circuit and generating said internal voltage through the charge pump operation when activated.

3. The voltage generation circuitry according to claim 2, wherein
said gate circuit prohibits transmission of said clock signal to said charge pump circuit when a mode control signal defining a conductive period of said second switch circuit instructs a conductive state of said second switch circuit.

* * * * *